United States Patent

[11] 3,626,317

| [72] | Inventors | Mark L. Dakss<br>Yonkers;<br>Richard L. Garwin, Scarsdale; Robert V. Pole, Yorktown Heights, all of N.Y. |
|---|---|---|
| [21] | Appl. No. | 12,789 |
| [22] | Filed | Feb. 19, 1970 |
| [45] | Patented | Dec. 7, 1971 |
| [73] | Assignee | International Business Machines Corporation<br>Armonk, N.Y. |

[54] DIGITALIZED SCANLASER
27 Claims, 3 Drawing Figs.

[52] U.S. Cl. .................................................. 331/94.5, 350/151
[51] Int. Cl. .................................................... H01s 3/00, G02f 1/22
[50] Field of Search ............................................ 331/94.5; 350/167; 350/161

[56] References Cited
UNITED STATES PATENTS

| 3,330,908 | 7/1967 | Good et al. ................. | 350/161 X |
| 3,138,663 | 6/1964 | McNaney ..................... | 350/96 X |
| 3,099,820 | 7/1963 | Ketchledge.................. | 340/146.3 |

*Primary Examiner*—Ronald L. Wibert
*Assistant Examiner*—Conrad Clark
*Attorneys*—Hanifin and Jancin and Bernard N. Wiener ABSTRACT: Generally, the disclosure describes a scanlaser with a fly's eye lens array for discretized or digitalized beam steering via mode selection. In a scanlaser, a localized change in birefringence changes the Q of the associated laser cavity so that only certain modes can be sustained in the cavity. A scanlaser in accordance with this disclosure incorporates a fly's eye lens array which selects only one of the latter modes for lasing in the cavity.

PRIOR ART

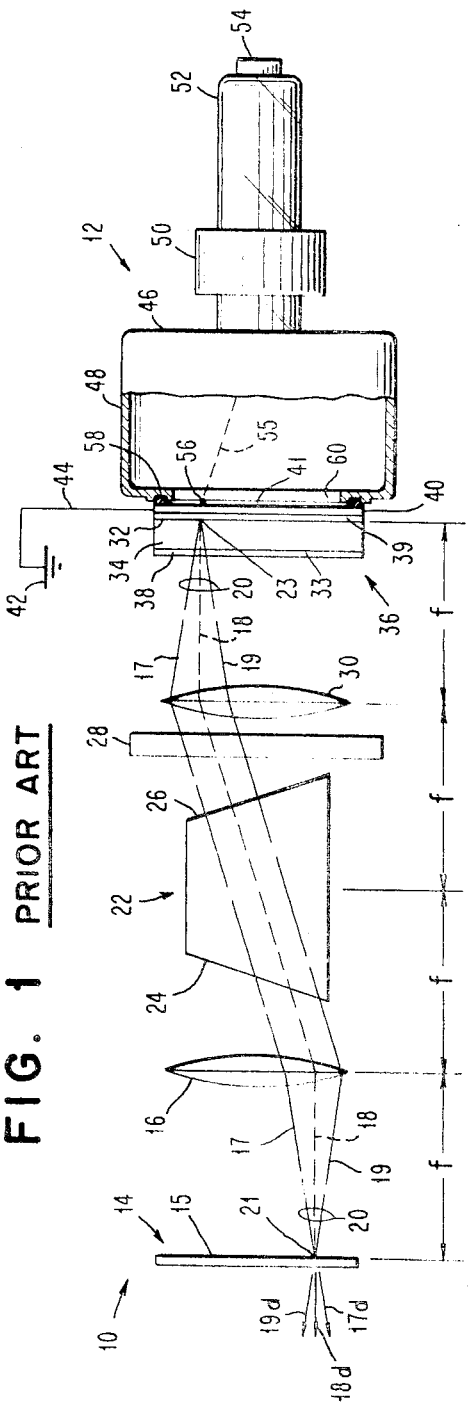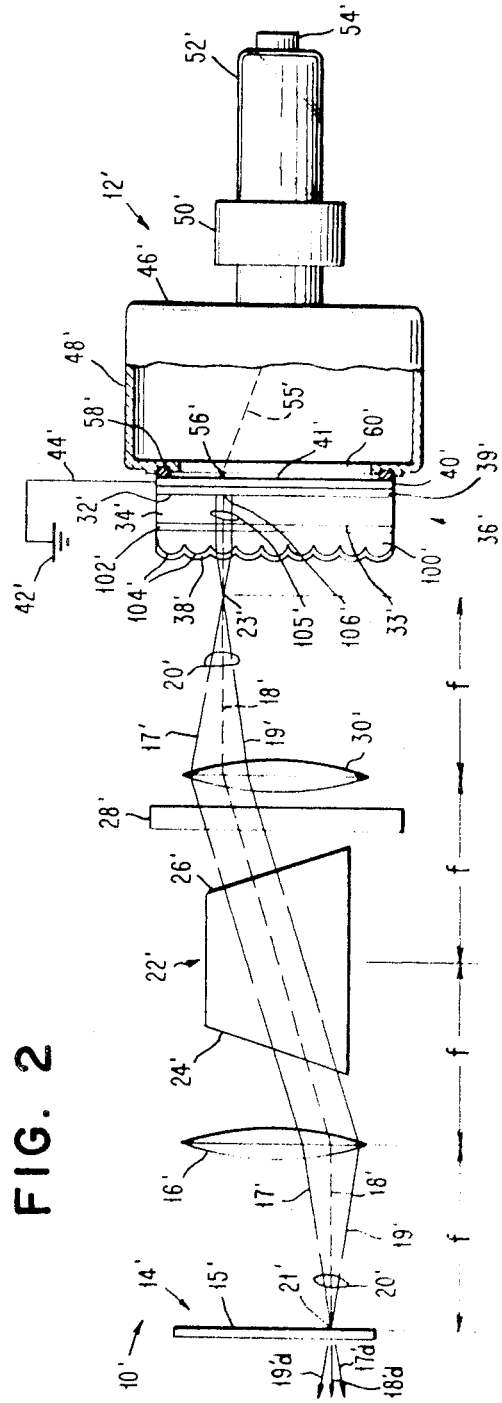
FIG. 1 PRIOR ART
FIG. 2
INVENTORS
MARK L. DAKSS
RICHARD L. GARWIN
ROBERT V. POLE
BY *Bernard N. Wiener*
ATTORNEY

DIGITALIZED SCANLASER

The disclosure describes particularly an electron beam scanlaser incorporating a fly's eye lens array in which precisely registered, discretized or digitalized laser beam steering is obtained, and undesirable effects due to surface imperfections in the electro-optic layer or due to deterioration of the optical reflecting coating thereon at high power are minimized. A fly's eye lens array is included in the path of the modes in the resonator section of the electron beam scanlaser, and the modes are focused in a plane other than that of the electro-optic crystal surface. In one embodiment, the fly's eye lens is positioned on the active medium side of the electro-optic layer so that only a certain discrete number of modes are collimated in the electro-optic crystal and come back upon themselves after reflection on the high reflectivity coating on the electro-optic layer. In another embodiment the fly's eye lens array is positioned on the electron beam side of the electro-optic layer by the use of a glue of matching index of refraction between the array and the surface of the electro-optic layer. In this case, the modes are not collimated in the KDP crystal and only a certain discrete number of them come back upon themselves upon reflection from a mirror surface on the fly's eye lens array.

BACKGROUND OF THE INVENTION

The prior art electron beam scanlasers most closely related in nature and operation to the basic structure of the electron beam scanlaser of this invention without the presence of the fly's eye lens array are disclosed in the following identified articles:

a. "The electron Beam Scanlaser: Theoretical and Operational Studies" by R. A. Myers and R. V. Pole, *IBM Journal of Research and Development*, Vol. 5, No. 5, Sept. 1967, pages 502–510.

b. "Fast Electron Beam Scanlaser," by R. A. Myers, *IEEE Journal of Quantum Electronics*, Vol. QE-4, No. 6, June 1968, pages 408–411.

An electron beam scanlaser is a scanning light source in which the easily deflected electron beam of a cathode-ray tube determines a spot from which laser light is emitted.

The electron beam scanlaser disclosed in the prior art article by R. A. Myers et al. included two dielectric mirrors and two lenses spaced such that one of the mirrors is imaged onto the other, with the chief ray for every point normally incident on both mirrors to form a flat field conjugate resonator. A large number of similar, degenerate modes are present, with the number given approximately by $N=\frac{1}{2}(ab\lambda f)^2$ where $1a=$ the width of a useful aperture of the active medium, $2b=$ the width of the exit aperture at the output mirror, and $f=$ focal length of the lenses included on either side of the active medium, and $\lambda=$ wavelength. Ordinarily, the Q is spoiled for all modes but one, which is allowed to be above threshold and oscillate. This is accomplished by locally changing the birefringence in the laser cavity. By selecting a different mode or set of modes, the spot from which the light is emitted can be scanned.

At present the most suitable electro-optic crystal for mode selection in an electron beam scanlaser is potassium dihydrogen phosphate, $KH_2PO_4$, commonly referred to as KDP. In the prior electron beam scanlaser, one laser mirror is formed by a high reflectivity coating on one KDP surface and the laser modes are focused on this surface. In order to obtain a uniform output field, it is necessary that the effects of the imperfections, e.g., scratches and pits, on the surface of the KDP crystal be minimized.

Another type of scanlaser which obtains local changes of birefringence in the laser cavity differently than in an electron beam scanlaser is the Kerr-Babinet scanlaser as described in:

a. Article entitled "Laser Deflection and Scanning" by R. V. Pole et al. at chapter 21, pages 351–364, of the book *Optical and Electro-optical Information Processing*, M.I.T. Press, 1965.

b. Copending and commonly assigned patent application Ser. No. 742,949, filed June 10, 1968 (which is a continuation of patent application Ser. No. 332,617, now abandoned), for "Scanning Laser Having a Conjugate Concentric Cavity so That The Direction in Which Light is Emitted Can be Controlled."

The noted Kerr-Babinet scanlaser is based on a resonator, e.g., a flat field conjugate resonator or a conjugate concentric resonator, capable of supporting a plurality of angularly degenerate transverse modes and containing a mode selector section for selection of such modes. The mode selection is accomplished by the interplay of three elements. One of these elements produces voltage-controlled time varying but mode-invariant phase retardation; this element can be a Kerr cell or an electro-optic crystal layer. The second element produces a phase retardation which is time invariant but varies from transverse mode to transverse mode. This element is a Babinet compensator. The third element is a linear polarizer. As in the electron beam scanlaser, mode selection is accomplished by spoiling the Q for all modes except the one selected.

The Q parameter for a mode of a laser cavity is a measure of how long the mode can be sustained therein. When the Q is spoiled, the mode cannot be sustained in the cavity. The Q is spoiled for the unselected modes via attenuation thereof at the linear polarizer because they are elliptically polarized when they impinge on this linear polarizer. A particular mode is selected by choosing the time-varying phase retardation to exactly compensate that introduced by the Babinet compensator for this mode. Thus, this mode has minimum attenuation at the linear polarizer and its Q is thereby unspoiled.

SUMMARY OF THE INVENTION

It is an object of this invention to provide a scanlaser with a relatively high degree of spatial coherence and relatively high power in the light output.

It is another object of this invention to achieve the foregoing object with a fly's eye lens array wherein every individual lenslet acts as a mode selector and selects only one transverse mode.

It is another object of this invention to discretize or digitalize the overall light field in a scanlaser.

It is another object of this invention to provide a scanlaser wherein impairment of the resonator mirror coatings due to extreme heating or dielectric breakdown is minimized.

It is another object of this invention to provide an electron beam scanlaser wherein the detrimental effect of scratches and other imperfections on the reflecting surface of an electro-optic layer is minimized.

It is another object of this invention to achieve the foregoing object by a fly's eye lens array wherein the light is focused in the layer of the electro-optic material.

It is another object of this invention to digitize the overall light field in an electron beam scanlaser with a fly's eye lens array wherein the position of every selected mode is determined by both the geometry of the included fly's lens array and the analog deflection voltages of the cathode-ray tube.

It is another object of this invention to provide an electron beam scanlaser wherein impairment of the high reflectivity coating on the electro-optic crystal due to extreme heating or dielectric breakdown is minimized.

The following are exemplary advantages of a digitalized scanlaser in accordance with the principles of this invention:

First, every individual lenslet acts as a mode selector and selects only one transverse mode. This in turn provides for a relatively high degree of spatial coherence of the light as well as for a higher power of the output than would be otherwise possible for such single mode operation.

Second, the fact that the light is not focused on the surface of the included electro-optic crystal eliminates the detrimental effect of the scratches on the crystal.

Third, the overall optical field is discretized so that the position of every selected mode is determined by both the geometry of the fly's eye lens array and the analog deflection voltages of the cathode-ray tube. This provides for precisely registered, discretized laser emissions.

Fourth, it minimizes the danger of the destruction of the individual layers in the high reflection coatings either through excessive heating or through dielectric breakdown.

Generally, this invention provides a scanlaser with a fly's eye lens array for discretized or digitalized mode selection. In a scanlaser, a localized change in birefringence changes the Q of the associated laser cavity so that only certain modes can be sustained in the cavity. A scanlaser in accordance with this invention incorporates a fly's eye lens array which selects one of the latter modes for lasing in the cavity.

More particularly in the practice of this invention, an electron beam scanlaser is provided wherein a fly's eye lens array is included in the path of the optical modes of the resonator section. For one aspect of this invention the fly's eye lens array is located in the resonator cavity between the focusing lens thereof and a layer of single-crystal potassium dihydrogen phosphate ($KH_2PO_4$), commonly referred to as KDP. It causes the optical modes in the resonator section of the electron beam scanlaser to be collimated into parallel rays which illuminate an area on the reflected layer contiguous to the optical surface of the KDP layer on the side of the electron beam in the cathode ray tube. In the practice of another aspect of this invention a fly's eye lens array is established between the electron beam and the optical surface of this KDP layer by gluing the fly's eye lens to the KDP with a glue having a matching index of refraction. Accordingly, the optical modes of the resonator section of the electron beam scanlaser can beneficially be focused relative to the KDP layer such that detrimental effects of imperfections are avoided.

Advantageously, detrimental heating of the KDP optical reflecting coating surface consequent from focusing the lasing modes thereon is minimized by the capability in the practice of digitalized electron beam scanlaser of this invention of focusing the optical modes away from the reflecting surface. Another advantage of the digitalized electron beam scanlaser device described herein is that the position of the lasing modes is established by the coincidence of the scanning electron beam and a lenslet of the fly's eye lens array. Consequently, a given mode appears always on the same geometrical position of the mirror near to the electron charge even if the position of the electron beam is uncertain within certain tolerances. Another advantage of the digitalized electron beam scanlaser of this invention is that every lenslet selects only one transverse mode. This provides for a relatively high degree of spatial coherence of the output beam and for a larger output power than would otherwise be obtainable for single mode operation.

Although the use of the fly's eye lens array as a means of discretizing the modes in the scanlaser is described in detail hereinafter in connection with an electron beam means of mode selection, the principles of this invention are applicable to any other means of mode selection in a spatially degenerate, multimode laser, e.g., the noted Kerr-Babinet scanlaser.

Illustratively, in the practice of the principles of this invention with the noted Kerr-Babinet scanlaser, fly's eye lens arrays are either positioned so that modes passing through the foci of the individual lenslets are collimated at each laser mirror and are reflected to come back upon themselves, or are positioned so that the curved portions of the fly's eye lens act as spherical reflectors at the ends of the laser cavity. In either case, advantageous discretization of modes, single transverse mode operation at increased output power, improvement of field uniformity and minimization of burning of the mirrors occur. If a thin electro-optic layer is used in the mode selector to produce the time-varying but mode-invariant phase retardation, a fly's eye lens is used to collimate the selected modes in this layer, thereby producing a minimization of sensitivity to scratches and other imperfections on this layer.

The use of the fly's eye lens is described in detail hereinafter in relationship to the mode selector side of the laser resonator of a scanlaser. However, a fly's eye lens can be used in relationship to the other resonator mirror in two alternative ways. The fly's eye lens is placed between this mirror and the rest of the resonator so that its lenslets produce collimation of modes on this mirror. The alternative way is to replace this resonator mirror by a fly's eye lens properly positioned and coated to have its curved surfaces act as spherical reflecting mirrors. In either way, burning of this resonator mirror is substantially minimized.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a schematic diagram of an electron beam scanlaser useful for describing the nature and operation thereof showing the focusing of an optical mode at a surface of the electro-optic layer in the absence of a fly's eye lens array.

FIG. 2 is a schematic diagram showing a preferred embodiment of an electron beam scanlaser in accordance with the principles of this invention including a fly's eye lens array positioned in the resonator section between the electro-optic layer and a focusing lens.

BRIEF DESCRIPTION OF PRIOR ART DEVICE OF

FIGURE 1

Figure 3:
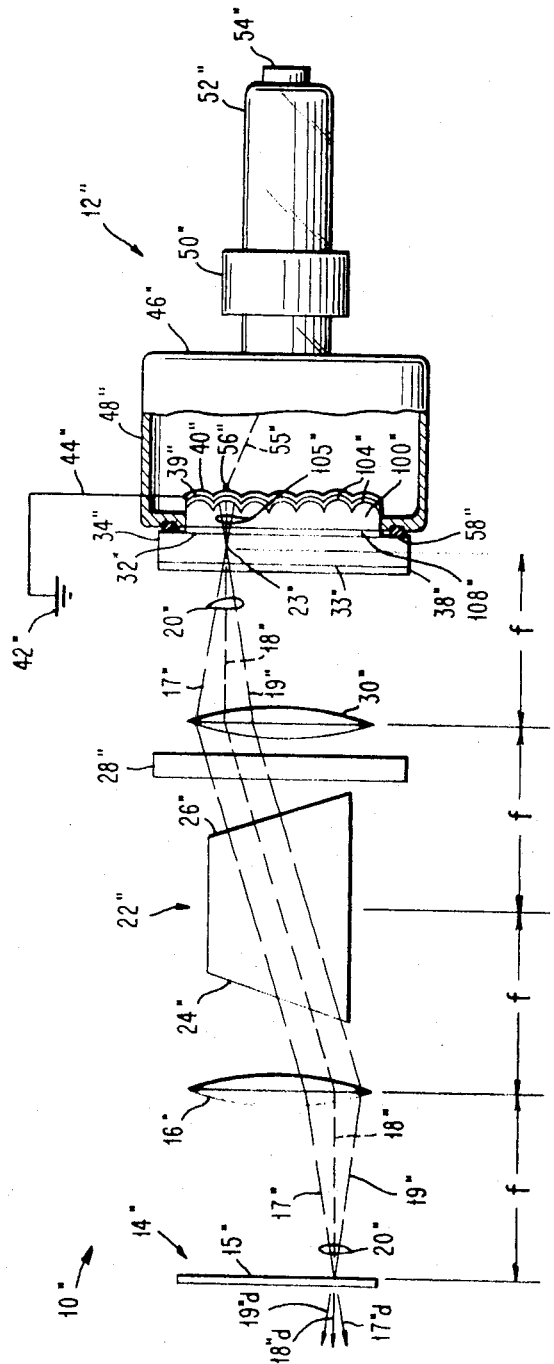
FIG. 3 shows another preferred embodiment of an electron beam scanlaser in accordance with the principles of this invention in which a fly's eye lens array is positioned between the electro-optic layer and the electron beam.

In order that the beneficial contribution of this invention for an electron beam scanlaser as presented in FIGS. 2 and 3 be understood in relationship to the practice of the prior art, the nature of the operation of an electron beam scanlaser related thereto will now be described briefly with reference to FIG. 1.

The exemplary prior art electron beam scanlaser of FIG. 1, according to the design of the noted literature article by R. A. Myers, I.E.E.E. Journal of Quantum Electronics, Vol. QE-4, No. 6, June 1968, pages 408–411, has two (overlapping) major sections: the resonator section 10 and the mode selector section 12. The resonator section 10 includes an active medium 22 with associated optical components to produce a flat-field conjugate laser resonator and the mode selector 12 includes a deflectable electron beam 55, a KDP layer 34, a polarizer (windows 24 and 28 of active medium 22), and a bias plate 28.

In the resonator section 10 of the electron beam scanlaser of FIG. 1 there is included an output mirror 14 which is established in the focal plane of lens 16. An exemplary ser of rays 17, 18 and 19 describe an optical mode 20 in resonator section 10 and have one focus at output mirror 14 which is partially transmitting. The rays 17, 18 and 19 of optical mode 20 are transmitted as parallel rays through an amplifying active medium 22 and then through the bias plate 28 and via lens 30 to the focal plane located at the surface 32 of KDP crystal 34. KDP layer 34 is included as part of sandwich structure 36 which comprises antireflecting coating 38 on the front surface 33 of KDP layer 34, high reflectivity coating 39 adjacent surface 32 of KDP layer 34 and germanium layer 40 on high reflectivity coating 38. Germanium layer 40 is connected to ground 42 via connection 44. The germanium layer can be replaced by any other partially insulating layer with which the charge leakage time can be controlled by proper choice of thickness, or it can be omitted, and the surface charge removed, as desired, by a flood beam of electrons of appropriate energy.

The cathode ray tube portion 46 of the mode selector section 12 comprises evacuated chamber 48, deflection coil 50 and electron beam source 52 including cable connection 54 for energizing the electron gun, not shown, various electrodes, focusing electrodes, and the deflection coil 50.

The electron beam scanlaser depicted in FIG. 1 emits light in the directions 17d, 18d and 19d from a selected point 21 on output mirror 14 at a given time. The resonator section 10 thereof is capable of supporting a large number of transverse modes such as mode 20 and the mode selector section 12 selects which of those modes lases at any given instant. The resonator section of the scanlaser must satisfy a number of requirements. It must support a large number of transverse modes which must be of as equal Q as possible, i.e., the resonator must be highly degenerate. Further, at least one possible set of such degenerate modes must be spatially distinct so that spatial mode selection is possible. It is also desirable for economy of utilization of the active lasing medium and for output uniformity that all possible modes use the same active volume.

The mirror surfaces 15 and 32 are located in the focal planes of lenses 16 and 30, respectively, and the resonating modes are thus focused on the mirrors. A typical mode identified by the number 20 is focused at point 21 on mirror surface 15 and at point 23 on mirror surface 32 of mirror 39. The chief ray of each mode, e.g., ray 18 of mode 20, terminates perpendicularly to each of the two planar mirrors 15 and 39. The function of the mode selector section 12 is to establish with electron charge an electric field in the KDP layer 34 which via the electro-optic effect produces birefringence in the layer in the region of the path of the mode 20. The mode 20 is linearly polarized by Brewster angle windows 24 and 26 on the active medium 22, or by a low-loss linear polarizer within the resonator, not shown. Bias plate 28 which has a uniform birefringence converts the linearly polarized output of the active medium 22 to elliptically polarized light. The reflected beam from KDP crystal 34 when again passed through Brewster angle windows 24 and 26, now acting as an analyzer, are attenuated, thereby lowering the Q of the resonator cavity. The Q of the resonator cavity 10 is thereby spoiled over the full optical field. The electron charge 56 deposited by the electron beam 55 on germanium layer 40 acts to raise locally the Q of the resonator cavity by inducing birefringence in the electro-optic layer 34 of KDP to compensate out the elliptically polarizing effects in the bias plate. Accordingly, only a certain mode 20 or a set of modes, localized in the region of the electric field is able to oscillate in the resonator 10, and is thereby selected.

Identical lenses 16 and 30 are selected to have the shortest focal length $f$ possible for the particular active medium 22 in order to optimize performance.

As an alternate to the use of a semiconducting layer 40 to leak off deposited electron charge, a transparent, conducting layer, e.g., CdO, can be coated on the face 38 of the KDP layer, as described in the noted article by R. A. Myers and R. V. Pole in *IBM Journal of Research and Development*, Vol. 5, No. 5, Sept. 1967, pages 502-510. This layer is connected to electrical ground 42. Charge then leaks through the KDP layer and out to ground via the conductive layer.

EMBODIMENTS OF THE INVENTION

VArious aspects of the electron beam scanlasers of FIGS. 2 and 3 according to the principles of this invention are numbered similarly to the comparable elements depicted in the prior art device of FIG. 1 where the numbers are primed in FIG. 2 and double primed in FIG. 3.

FIGURE 2

The changes made to the electron beam scanlaser depicted in FIG. 1 to obtain the electron beam scanlaser embodiment of this invention depicted in FIG. 2 involve omitting the antireflecting coating 38 from the surface of the KDP crystal on the side of the resonator cavity 10 and affixing with glue to the KDP crystal 34' a fly's eye lens array 100' with lenslets 104'. An antireflecting coating 38' is deposited on the lenslets 104'. The fly's eye lens 100' is affixed to KDP crystal 34' by an index of refraction matching glue layer 102'. Additionally, the focal point 23' of the optical mode 20' is in the focal plane of the fly's eye lens. This focal plane is in the cavity 10' outside of the sandwich 36'. The rays 17', 18' and 19' of optical mode 20' become parallel after passing through one lenslet 104' and illuminate an area 106' on the surface of high reflectivity coating 32'.

A fly's eye lens array comprises a multiplicity of small lens portions established in proximity to each other in accordance with a regular pattern. In the prior art, fly's eye lens arrays have consisted of both a plurality of lenses of a particular optical characteristic, either individually fabricated and organized in an array or in sheet form where the individual lenslets are stamped on the surface of a material of a requisite optical quality. The lenslets 104' incorporated as the individual lenses of fly's eye lens array 100' in FIG. 2 have singlet optical characteristic. A fly's eye lens is commonly referred to as having a lenticular structure. It can be readily molded in plastic, glass and other materials having suitable light-refracting characteristics. The optical property of each lenslet 104' of fly's eye lens array 100' is of such optical characteristic that light rays arriving at the surface thereof from the mode which is focused at the focal point of such lenslet is collimated into a ray bundle which strikes perpendicularly the reflecting surface 32' and returns upon itself. The antireflecting coating 38' is shown in FIG. 2 as conforming to the surface contour of fly's eye lens array 100'. The function of antireflecting coating 38' is to minimize reflection losses.

The contributions of the optical components in the resonator section 10' are the same as those described above with respect to the prior art electron beam scanlaser depicted in FIG. 1. The resonator laser cavity 10' can support a large number of different optical modes, each of which produces an output beam emanating from a different spot 21' on the mirror surface 15' of output mirror 14'. When an optical mode 20' is excited in resonator cavity 10', it is stabilized in nature and location between point 21' on output mirror surface 15' and area 106' of high reflectivity coating 32'.

As described for the prior art scanlaser of FIG. 1, the bias plate 28' spoils the Q of all the modes in the absence of any electron charge on the semiconducting coating 40'.

In order to switch on a particular optical mode 20' which passes through the focal point 23' of one of the lenslets 104' in the fly's eye lens array 100' in the resonator cavity 10', the electron beam of cathode-ray tube 46' is directed at a particular spot on the semiconducting layer surface 41' approximate to the area 106' of the surface 32' hit by bundle 105' of the optical rays of optical mode 20'. Electron charge 56' on surface 41' produces an electric field in KDP crystal 34' which produces birefringence therein because KDP is an electrooptic crystal. The electric field, due to the charge, is selected such that the birefringence produced in the KDP layer 34' will compensate out the elliptically polarizing effects in the bias phase 28'. Therefore, the particular mode 20' which is collimated on area 106' has zero phase retardation due to the combined action of the bias plate 28' and the electric field due to electron charge 56' in KDP layer 34'. Therefore, when this particular mode bounces back through the active medium 22', all of the mode is transmitted thereby and only that mode will lase in the resonator cavity 10'.

Any mode of the laser cavity which is not focused at the focal point 23' of a lenslet 104' in the fly's eye lens array 100' will not oscillate in the laser cavity because it will not come back upon itself after reflection at the high reflectivity coating 39'. Consequently, the output optical field from output mirror 14' of the electron beam scanlaser illustrated in FIG. 2 is digitalized.

Since the focus point 23' of optical mode 20' by lens 30' is not at the surface of KDP layer 32', the heating thereat and effect of imperfections thereat is obviated by having the bundle of rays 105' spread out over the area 106'. The optical mode 20' is effectively collimated over an area approximately equal to the diameter of the particular lenslet 104' of the fly's eye lens array 100' upon which it is directed. Therefore, each optical mode 20' utilizes a relatively large area of the KDP surface 32' and any scratches thereat are unimportant, since each optical mode occupies a large area of the mirror surface.

An alternative to the use of semiconductor layer 40' used in this embodiment to leak off charge is the use of a grounded transparent conductive coating, e.g., CdO, placed between the glue layer 102' and the KDP layer 34'. This coating collects deposited charge after it traverses the KDP layer. The nature and function of such a transparent conductive coating of CdO is described in greater detail in the noted article by R. A. Myers and R. V. Pole in *IBM Journal of Research and Development*, Vol. 5, No. 5, Sept. 1967, pages 502-510.

FIGURE 3

The embodiment of an electron beam scanlaser in accordance with the principles of this invention depicted in FIG. 3 utilizes a fly's eye lens array 100'' located between the KDP layer 34'' and the electron beam 55''. The fly's eye lens array 100'' is affixed to the surface 32'' of KDP crystal layer 34'' via layer of glue 108'', which has an index of refraction which is approximately equal to that of the KDP crystal 34''. Glue 108'' fills in any scratches or other imperfections on the surface 32'' of KDP crystal 34'' and the optical property of the surface 32'' is effectively as if the imperfections were not there. In FIG. 3, optical mode 20'' is focused by lens 30'' at focal point 23'' of lenslet 104'' within the body of KDP layer 34''. Lenslets 104'' returns bundle 105'' to focal point 23''. The bundle 105'' intercepts an area on the surface 32'' of KDP layer 34'' which does not act as a reflecting surface. The fly's eye lens array 100'' with lenslets 104'' together with the high reflectivity coating 39'', acts as the mirror for the resonator cavity 10''. Both the high reflectivity coating 39'' and the semiconducting layer 40'' are shown in the electron beam scanlaser in accordance with the principle of this invention depicted in FIG. 3 as conforming to the contour of the fly's eye lens array 100'' and as having a conforming surface thereof at the electron beam 55'' side.

Any mode of the laser cavity which is not focused at the effective center of curvature 23'' of a lenslet 104'' in the fly's eye lens array 100'' will not oscillate in the laser cavity because it will not come back upon itself after reflection at the high reflectivity coating 39''. Consequently, the output optical field from output mirror 14'' of the electron beam scanlaser illustrated in FIG. 3 is digitalized.

Because the optically detrimental effect of the scratches on the surface of the KDP layer has been obviated by the glue layer 108'', having an index of refraction matching that of the KDP layer, the focal point 23'' of optical mode 20'' can be focused close to or at the surface 32'' of KDP crystal 34''. However, it need not be focused there, e.g., if heating effects are to be minimized.

The resonator section 10'' of electron beam scanlaser depicted in FIG. 3 is otherwise identical to the resonator section 10' depicted in FIG. 2.

CONSIDERATIONS FOR THE INVENTION

An angularly degenerate laser cavity is provided by this invention including an active medium located between two reflective surfaces. The laser cavity is capable of emitting beams of laser light along a plurality of separate axes of the cavity. A linear polarizer and an optical retardation plate are inserted into the laser cavity to introduce a polarization bias. A cathode-ray tube is located at one of the reflective surfaces of the laser cavity and a layer of electro-optic material is placed adjacent to this reflective surface. The electro-optic layer responds to electron charges established proximate thereto by the electron beam of the cathode-ray tube and produces a birefringence which counteracts the effect of the retardation introduced by the bias plate. Thereby, a preferred axis for lasing is set up at the point where the electron beam is positioned. For one aspect of the invention, a fly's eye lens array is incorporated in the path of the optical mode. Its effect is to cause the rays of the optical mode to illuminate a cylindrical portion of the KDP crystal wherein the electron beam establishes an electric field. The fly's eye lens array is positioned to collimate the optical modes to a parallel bundle of rays which are then reflected at the KDP crystal surface. For another aspect of the invention the fly's eye lens array on the electron beam side is positioned to return the incident optical mode to the optical resonator via the focal within or near to the KDP crystal. The preferred electro-optic crystal now available in large sizes, with excellent optical quality, and a large electro-optic constant is potassium dihydrogen phosphate, $KH_2PO_4$, commonly known as KDP. Because of softness and sensitivity to corrosion by moisture, it is extremely difficult to put a polish on KDP that is both flat to the required tolerances, e.g., 1/5 to 1/10 of a standard optical wavelength, i.e., the sodium D line wavelength, and free of scratches and pits. The scratches and pits have been detrimental to the uniformity of the output optical field.

In the practice of this invention, the focusing of the modes on the KDP surface can be avoided by the addition of the fly's eye lens array. For one embodiment of the invention provided herein a fly's eye lens array is glued onto the front surface of the KDP crystal. The crystal sandwich is positioned so that the optical modes are focused in the front focal plane of the fly's eye lens array. Only the lasing modes which are focused on the axis of individual lenslets are collimated thereby and return upon themselves after reflection, thereby producing digitalization of the output optical field. These rays form essentially parallel beams in the KDP crystal, with each beam occupying a cross-sectional area in the crystal of about the lenslet size, e.g., approximately 10 mils or more. This is much larger than the scratch or pit sizes which are usually under 1 mil dimension so that the integrated reflecting area of the mirror for one lenslet is closely the same from lenslet to lenslet.

For another embodiment of the invention presented herein the fly's eye lens array is glued to the rear surface of the KDP crystal on the cathode-ray tube side and the curved lenslet surfaces are coated with a dielectric mirror and act as spherical reflecting mirrors. A glue is used which matches the index of refraction of the KDP and the modes are focused on the rear surface of the KDP or within the KDP crystal.

Because of the angular selectivity of the lenslets of the fly's eye lens array, a single transverse mode operation is still obtainable at high density of the deposited electron charge. Therefore, there is larger output power than with no fly's eye lens. Single mode operation has been provided in the prior art by limiting the charge density so that only a small region of the charge spot is above threshold, and which therefore cannot be much above threshold.

The resolution of the electron beam scanlaser of this invention depends on the size of the lenslets. Lenslets with as small as 0.010 inch spacing are commercially available. Illustratively, the lens may be used with a 1 mm. spacing between lenslet centers. With a 2-inch × 2-inch KDP crystal, a digitalized output field of about 200×200 resolvable spots is obtained.

Additional exemplary design details for the practice of this invention with the embodiments illustrated in FIGS. 2 and 3 will now be presented with reference to the prior art device illustrated in FIG. 1. The sandwich structure 36 is affixed to the face 56 of chamber 48 via O-ring 58 which surrounds window 60 in face 56 of chamber 48. When chamber 48 is evacuated, external pressure from the atmosphere holds sandwich 36 securely in vacuum-packed relationship to chamber 48 on surface 56. An alternative design of the technique for maintaining sandwich 36 in relationship to chamber 48 of cathode ray tube 46 may be in accordance with conventional design procedure.

The resonator section 10 of electron beam scanlaser depicted in FIG. 1 is an optically conjugate resonator where the term conjugate implies that the reflective surface 15 of output mirror 14 and reflective surface 32 of sandwich 36 are optically connected so that they are imaged on one another, i.e., the object and image planes are mirror surfaced. The resonator section 10 is the flat field conjugate resonator of the type described in the article by R. A. Myers and R. V. Pole, *Journal of the Society of America*, Vol. 55, 1965, page 1574 et seq. The lenticular imaging action is separate from the active medium and is provided by separate lenses which are chosen and positioned so that the degeneracies are achieved over a flat or planar optical field.

The active medium 22 is a hollow cathode ionized mercury discharge tube of the type described in an article by R. L. Bauer et al., *Journal Optical Society of America*, Vol. 55, 1965, pages 1598 et seq. An illustrative design for the active medium 22 is a cathode tube 25 mm. in diameter and from 75 mm. to 200 mm. long which is mounted in a closely fitting glass tube with welded and flexible wires which serve as the cathode leads. An anode of 20-gauge tantalum wire is placed about 1 cm. from each end of the cathode in the form of rings and is welded to a tungsten feedthrough. Brewster angle windows 24 and 26 are mounted on the ends of the glass tube with a thin layer of epoxy cement. The power supply may be a high-voltage pulse generator for operation at pulse rates of from approximately 200 to 5,000 pulses per second. Illustrative parameters are pulse duration of 0.8 microseconds, pulse voltage for laser operation of 2.2 kv., and a pulse current of approximately 30 amp. Alternative active media conventional in the laser field are suitable, e.g., the crystal Nd-doped yttrium aluminum garnet or an argon ion discharge.

The electro-optic layer 34 is typically a Z-cut KDP or deuterated KDP crystal of dimensions 25 mm. × 25 mm. × 3 mm. Another material with a longitudinal electro-optic effect can be used instead of KDP. The Brewster angle windows 24 and 26 on the active medium 22 discharge tube effect polarization of the laser emission. A low-loss linear polarizer may be used instead of windows, if a high-gain laser requires it. Germanium layer 40 determines the decay time in accordance with its conductivity properties and the resistance and capacitance in its circuit.

We claim:
1. An electron beam scanlaser comprising:
   an angularly degenerate laser cavity capable of oscillating in a plurality of transverse optical modes;
   a cathode-ray tube capable of scanning an electron beam in proximity to said modes; and
   means for selecting one said mode for oscillations in said cavity including
   electro-optic layer means for causing said electron beam to interact with said optical mode, and
   fly's eye lens array means having a plurality of lenslets for selectively illuminating said electro-optic layer with said one optical mode via one lenslet thereof.
2. An electron beam scanlaser as set forth in claim 1 wherein said electro-optic layer is potassium dihydrogen phosphate, $KH_2PO_4$.
3. An electron beam scanlaser as set forth in claim 1 wherein said fly's eye lens array means is positioned in said laser cavity to collimate said one mode in said electro-optic layer via said one lenslet thereof.
4. An electron beam scanlaser as set forth in claim 1 wherein said fly's eye lens array means is positioned in said laser cavity to focus said one optical mode in relationship to said electro-optic layer via said one lenslet thereof to spread out said mode on the surface of said electro-optic layer.
5. An electron beam scanlaser as set forth in claim 4 wherein said optical mode is focused within said electro-optic layer.
6. An electron beam scanlaser comprising:
   an angularly degenerate laser cavity capable of oscillating in a plurality of degenerate transverse optical modes, each said mode corresponding to an output beam of said cavity emanating from a different point on an output mirror of said cavity,
   polarizer means in said cavity for linearly polarizing said optical modes,
   bias plate means in said cavity for introducing a given amount of phase retardation between two perpendicularly directed polarization components of each of said linearly polarized modes,
   an active medium in said cavity for sustaining the oscillation of said modes in said cavity,
   optical lens means for introducing said angular degeneracy in said cavity, said lens means making said cavity flat-field conjugate;
   cathode-ray tube means for providing a scannable electron beam;
   means for selecting one said mode for oscillation in said cavity including
   a layer of single crystal electro-optic material for introducing via said electron beam a compensating phase retardation to that introduced in said optical mode by said bias plate means, and
   fly's eye lens array means having a plurality of lenslets for selectively illuminating said electro-optic layer with said optical modes via said lenslets thereof.
7. An electron beam scanlaser as set forth in claim 4 wherein said electro-optic material is potassium dihydrogen phosphate, $KH_2PO_4$.
8. Apparatus for controlling the direction of a laser beam comprising:
   an angularly degenerate flat field conjugate laser cavity for supporting a plurality of different modes of laser beam oscillation;
   laser beam emission control means including a material exhibiting an electro-optic effect located in said cavity in the path of said different modes of light beam oscillation;
   means for directing an electron beam selectively onto said electro-optic material for establishing an electric field in a selected portion thereof;
   lens means in said laser cavity for focusing said laser beams relative to said electro-optic material; and
   a fly's eye lens array having a plurality of lenslets arranged in a regular geometric pattern for coupling one of said modes to said electric field in said selected portion of said electro-optic material.
9. Apparatus as set forth in claim 8 wherein said fly's eye lens array collimates said light beam oscillations in said electro-optic material.
10. Apparatus as set forth in claim 8 wherein said fly's eye lens array focuses said light beam in said electro-optic material.
11. Apparatus for controlling the direction of a laser beam comprising:
   means for producing an electron beam and controlling the position of said electron beam;
   an angularly degenerate laser cavity including a plurality of different modes of oscillation;
   laser beam emission control means located within said cavity including a layer of electro-optic material in the path of said modes and in the path of said electron beam for altering the polarization of one of said modes corresponding to the position of said electron beam and causing said cavity to emit laser beam at the position of said electron beam; and
   optical lens means in said cavity for collimating each said mode of oscillation on a different area of a surface of said electro-optic material.
12. Apparatus as set forth in claim 11 wherein said electro-optic material has a planar surface parallel to a focal plane of said laser cavity and said optical lens means has a fly's eye lens array with a plurality of lenslets whose focal planes are also parallel to said focal plane.
13. An electron beam scanlaser comprising a resonator section capable of supporting a plurality of optical modes; a mode selector section having an electron beam means for sequentially selecting said modes;

electro-optic layer means for coupling said electron beam with said modes in said resonator section for coarse spatial mode selection; and fly's eye lens array means positioned between said resonator section and mode selector section for fine spatial mode selection.

14. The combination as set forth in claim 13 wherein said fly's eye lens array means includes a plurality of lenslets for yielding respectively a selected one of a number of discrete modes of said plurality of modes.

15. The combination as set forth in claim 14 wherein said fly's eye lens array means is positioned in said resonator section to collimate said one mode in said electro-optic layer means via said one lenslet.

16. The combination as set forth in claim 14 wherein:
said fly's eye lens array means is positioned in said resonator section to focus said one mode in relationship to said electro-optic layer means via said one lenslet to spread out said mode on the surfaces of said electro-optic layer means.

17. The combination as set forth in claim 16 wherein said one mode is focused within said electro-optic layer means.

18. A scanlaser comprising a resonator section capable of supporting a plurality of degenerate transverse optical modes; a mode selector section;
electro-optic layer means for producing coarse spatial mode selection; and
fly's eye lens array means for fine spatial mode selection.

19. The combination as set forth in claim 18 wherein:
said fly's eye lens array means includes a plurality of lenslets for yielding respectively a selected one of a number of discrete modes of said plurality of modes.

20. The combination as set forth in claim 19 wherein:
said fly's eye lens array means is positioned in said resonator section to collimate said one mode in said electro-optic layer means via said one lenslet.

21. The combination as set forth in claim 19 wherein said fly's eye lens array means is positioned in said resonator section to focus said one mode in relationship to said electro-optic layer means via said one lenslet to spread out said mode on the surfaces of said electro-optic layer means.

22. The combination as set forth in claim 21 wherein said one mode is focused within said electro-optic layer means.

23. Apparatus for controlling the direction of a laser beam comprising:
an angularly degenerate laser cavity for supporting a plurality of different transverse modes of oscillation including at least two mirror surfaces;
means for producing locally changes in birefringence in said cavity;
laser beam emission control means located within said cavity including a layer of electro-optic material in the path of said modes for altering the polarization of said modes for thereby selecting only one mode for oscillation in said cavity and for causing said cavity to emit a laser beam in a corresponding position; and
optical lens means in said cavity for collimating said each mode of oscillation on a different area of at least one of said surfaces of said resonator mirrors.

24. Apparatus as set forth in claim 23 wherein said optical means includes fly's eye lens array means in said cavity for collimating each said mode of oscillation on a different area of at least one of said resonator mirrors.

25. Apparatus for controlling the direction of a laser beam comprising:
an angularly degenerate laser cavity for supporting a plurality of different transverse modes of oscillation including at least two mirror surfaces;
means for producing locally changes in birefringence in said cavity;
laser beam emission control means located within said cavity including a layer of electro-optic material in the path of said modes for altering the polarization of said mode for thereby selecting only one mode for oscillation in said cavity and for causing said cavity to emit a laser beam in a corresponding position; and
optical lens means in said cavity for collimating said each mode of oscillation on a different area of at least one of said surfaces of said electro-optic material.

26. Apparatus for controlling the direction of a laser beam comprising:
an angularly degenerate laser cavity for supporting a plurality of different transverse modes of oscillation including at least two mirror surfaces;
means for producing locally changes in birefringence in said cavity;
laser beam emission control means located within said cavity including a layer of electro-optic material in the path of said modes for altering the polarization of said mode for thereby selecting only one mode for oscillation in said cavity and for causing said cavity to emit a laser beam in a corresponding position; and
optical lens means in said cavity for yielding respectively a selected one of a number of discrete modes of said plurality of modes.

27. Apparatus for controlling the direction of a laser beam comprising:
an angularly degenerate laser cavity for supporting a plurality of different transverse modes of oscillation, and
a mode selector section having electro-optic layer means for coarse spatial mode selection and
fly's eye lens array means for fine spatial mode selection.

* * * * *